United States Patent [19]

Metsa-Ketela

[11] 4,059,508
[45] Nov. 22, 1977

[54] CONVEYOR FOR GRANULAR MATERIAL

[76] Inventor: Jorma Metsä-Ketelä, 60800 Ilmajoki, Finland

[21] Appl. No.: 738,466

[22] Filed: Nov. 3, 1976

[30] Foreign Application Priority Data

Nov. 7, 1975 Finland .................................. 753137
Jan. 28, 1976 Finland .................................. 760209
Oct. 7, 1976 Finland .................................. 762853

[51] Int. Cl.² .......................... B07B 4/02; B65G 43/00
[52] U.S. Cl. .................................... 209/151; 198/367;
198/636; 198/637; 198/670; 198/671; 209/480;
366/322

[58] Field of Search ............... 198/360, 362, 364, 366,
198/367, 369, 370, 670, 636, 637, 671, 666, 672;
259/9, 10, 97, 191; 209/138, 139 R, 147, 151,
250, 480, 153

[56] References Cited

U.S. PATENT DOCUMENTS

| 1,474 | 1/1840 | Bull ........................................ 209/153 |
| 931,054 | 8/1909 | Gardner .................................. 198/671 |
| 3,451,531 | 6/1969 | Barnes .................................... 198/671 |

FOREIGN PATENT DOCUMENTS 938,513  10/1963  United Kingdom ................. 209/147

Primary Examiner—Evon C. Blunk
Assistant Examiner—Joseph E. Valenza
Attorney, Agent, or Firm—Steinberg & Blake

[57] ABSTRACT

A conveyor for granular material includes an elongated hollow channel covered by a suitable cover and having a hollow interior along which the granular material is to be conveyed. A rotary screw extends along the hollow interior of the channel for conveying the granular material therein, this rotary screw including an elongated shaft and a screw carried thereby. Between the opposed ends of the elongated shaft there is situated within the channel at least on bearing which supports the shaft for rotary movement, and a transverse wall extends across the interior of the channel and is supported thereby, this transverse wall carrying the bearing, so that the bearing together with the transverse wall carrying the same block the travel of the granular material longitudinally along the interior of the channel. A bypass structure cooperates with the channel at the region of the transverse wall and bearing carried thereby for providing for the granular material a path of flow bypassing the transverse wall and bearing, so that in this way the shaft of the rotary screw can be effectively supported for rotary movement while at the same time the material can be effectively conveyed.

9 Claims, 17 Drawing Figures

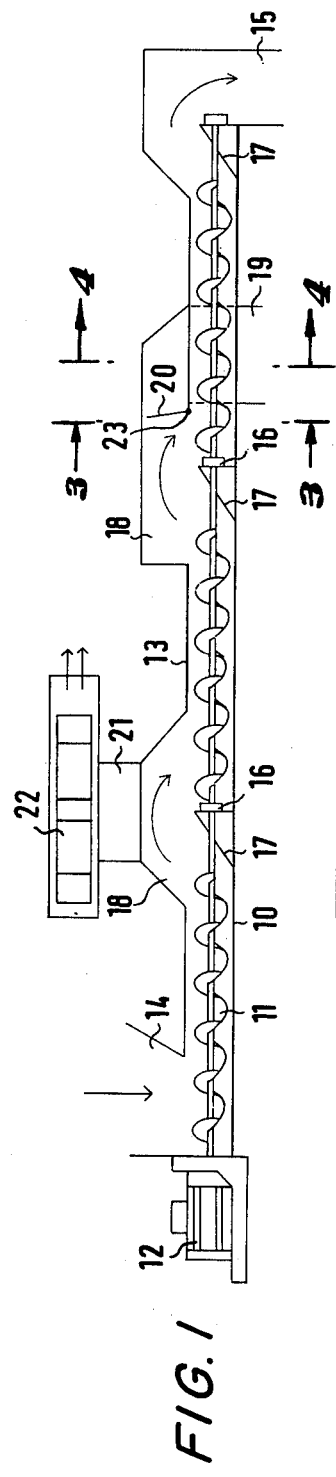
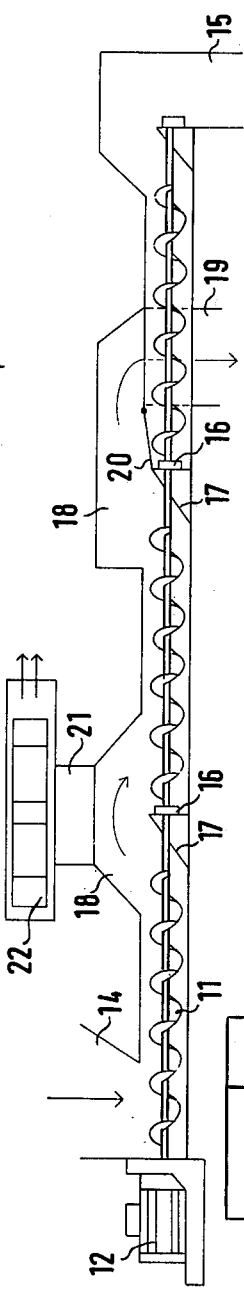
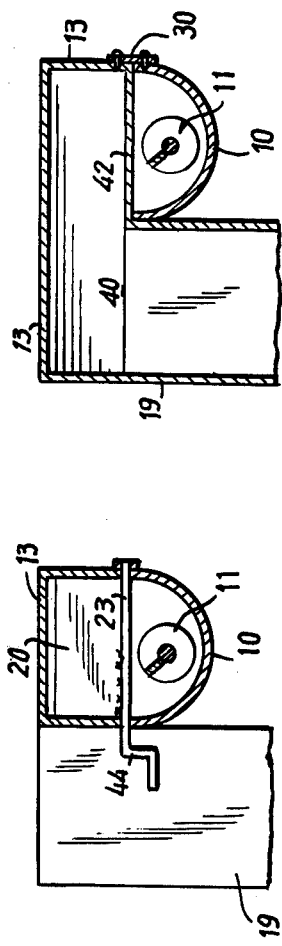
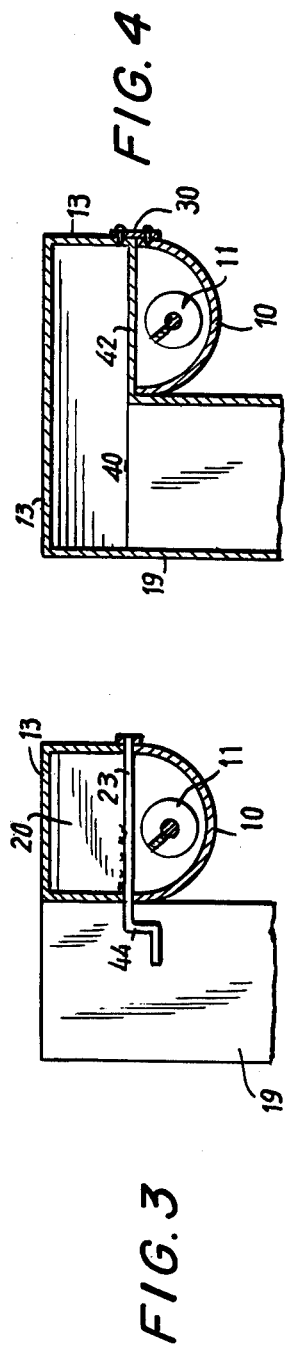
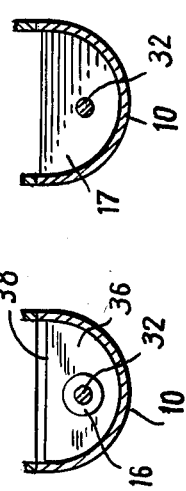
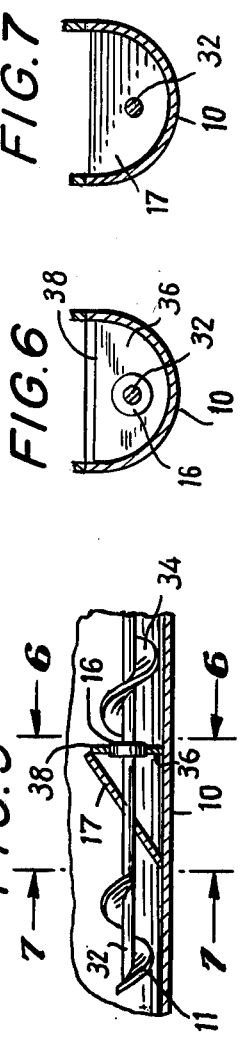
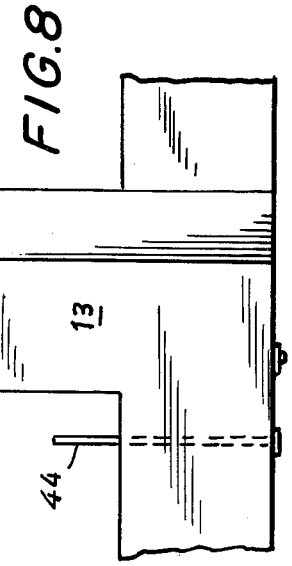

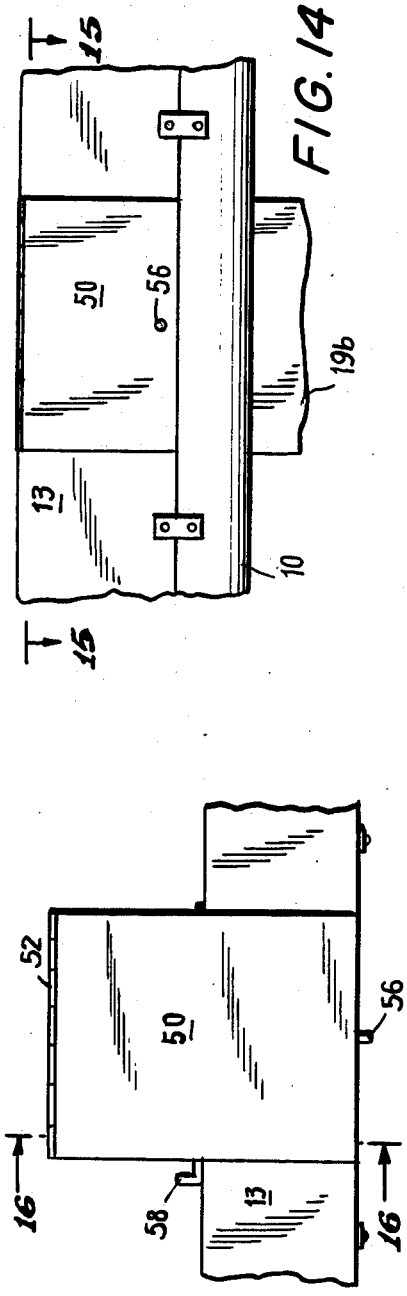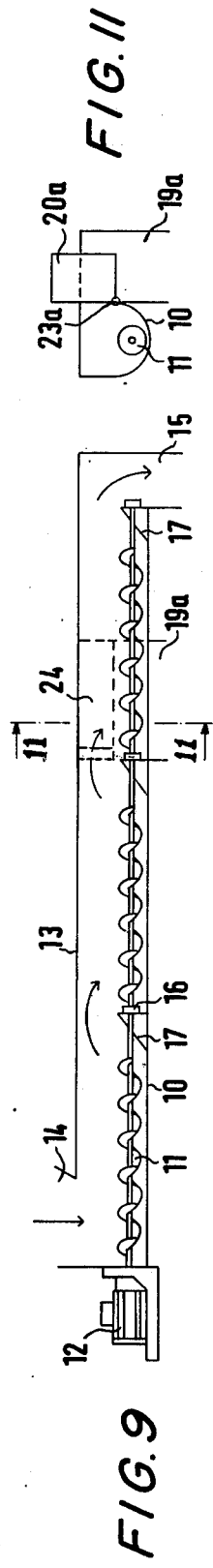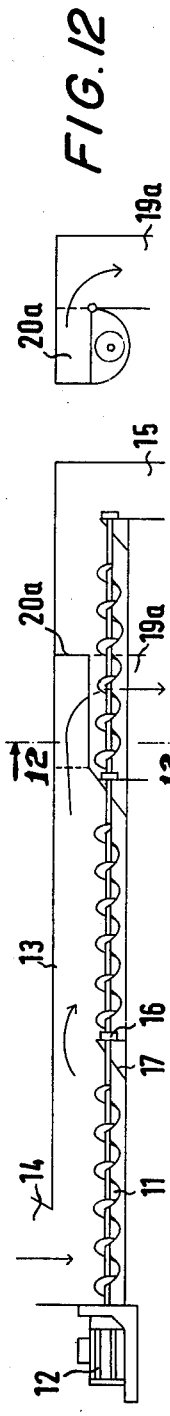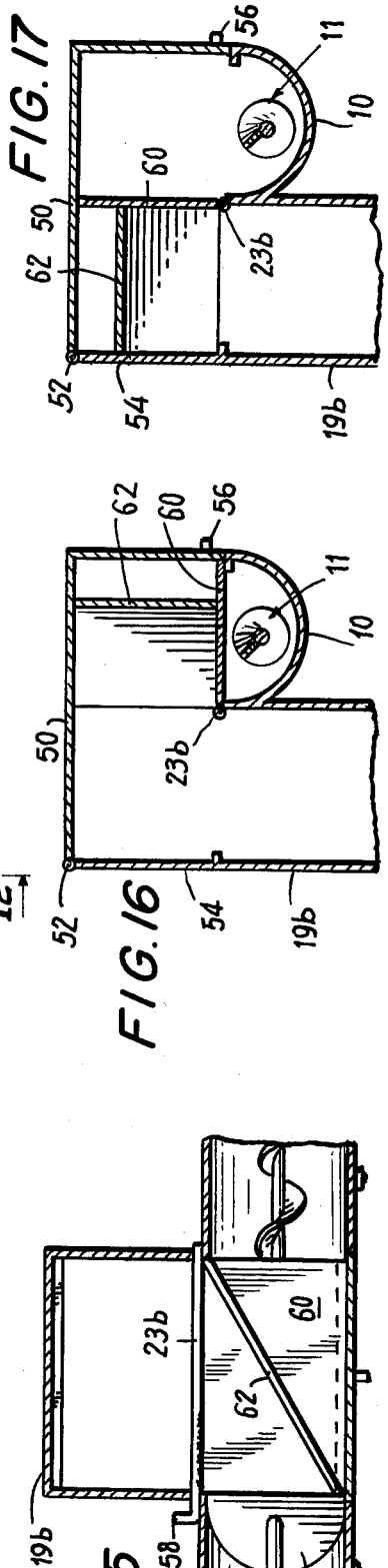

CONVEYOR FOR GRANULAR MATERIAL

BACKGROUND OF THE INVENTION

The present invention relates to conveyers for bulk material such as granular material.

This conveyor of the invention is of the type which includes an elongated channel having a rotary transport screw disposed therein, a suitable drive being connected to the screw for rotating the same and the channel being covered by a cover. The granular material, such as grain, enters into the channel through a suitable inlet aperture while at least one outlet aperture is provided through which the granular material can be discharged. The rotary screw is supported by one or more bearings situated in the channel between the opposed ends of the rotary screw, and the support of this screw is such that it does not contact the channel.

Screw conveyors of the above type have been conventionally used in order to transport grain or other granular materials generally along a horizontal path. The distance through which the grain or other granular material is transported by such conveyors is usually on the order of 5–10 meters, and the transporting capacity is on the order of several tons per hour. It is of course possible to construct longer screw conveyors, so that the transporting distance may be on the ordrer of 20–30 meters, and in principle it is possible to construct even longer conveyors. Such screw conveyers are also known to have a relatively high transporting capacity.

With conventional screw conveyors of the above type there is generally a channel of substantially of U-shaped cross section supporting within itself the rotary conveyer screw. The channel generally has a removable cover. The conveyer screw is supported in the channel by bearings situated at suitable locations along the conveyer screw, the support of the latter being such that it does not contact the channel itself. The material is usually introduced into the conveyer through an aperture at the top of the conveyer, while discharge of the material usually takes place at an end of the conveyer, although it is also possible to discharge material from a location situated at an intermediate part of the conveyor. Often the screw conveyer is relatively long, and in this case it is possible to provide discharge at any one of a number of different points along the conveyer, generally at one point at a time. For this purpose one or more discharge apertures are provided along the conveyer usually at the bottom or side of the channel, and such discharge apertures may be selectively opened by a suitable closure flap provided for each such aperture. Thus when the latter flap is closed the material will be conveyed to the end of the conveyer while when a selected flap is opened the material will be discharged through an aperture situated in advance of the end of the conveyer.

With conventional screw conveyer attempts have been made to make the bearings of the conveyer screw as small as possible so that these bearings will not interfere with the passage of the material past the bearings. Moreover, in order that the material will reliably fall by gravity through a discharge aperture situated in advance of the end of the conveyer, it is essential to make such an aperture of a sufficiently great length, and, in addition, the speed of rotation of the conveyer screw should be small enough so that the material which is transported, or at least part of it, will not be transported along with the conveyer screw beyond the aperture through which it is desired to discharge the material. As a result of structural limitations of the above type encountered in conventional screw conveyors, these conveyers have a relatively low capacity, a relatively large size, and involve high costs. Because of the low speed of rotation, the transported material will remain as a residue at the bottom of the channel after the transporting operations are completed. It is therefore not possible with conventional conveyers to change rapidly from one conveyed material to another conveyed material inasmuch as the residual material at the bottom of the channel must first be removed in some way before a different material is handled by the conveyer.

SUMMARY OF THE INVENTION

It is accordingly a primary object of the present invention to provide a screw conveyer of the above general type which will avoid the above drawbacks.

In particular, it is an object of the present invention to provide a screw conveyer capable of operating at substantially higher speeds of rotation than have heretofore been possible, so as to achieve in this way with a relatively small conveyer a high transporting capacity.

Furthermore, it is an object of the present invention to provide a relatively simple construction for the screw conveyer.

In addition, it is an object of the invention to provide for bearings of the rotary screw exceedingly strong mountings, as well as the capability of utilizing larger bearings with a larger and sturdier screw shaft. Thus, by being able to utilize these latter features it is possible to provide a higher speed of rotation and thus obtain a higher transporting capacity.

In addition it is an object of the present invention to provide a conveyer which may be made longer than normal while at the same time achieving a conveyer which is durable and reliable in operation.

Moreover, it is an object of the present invention to provide conveyer conveyor where the screw can have high speed of rotation so that if desired a conveyer of relatively small size constructed in accordance with the present invention will achieve the equivalent transporting capacity of conventional conveyers of larger size.

Furthermore, it is an object of the present invention to provide a construction according to which there will be no residue of transported material remaining at the bottom of the conveyer after transportation thereof, as a result of the high speed with which the material is transported, so that in this way with the conveyer of the invention it is possible after a given material has been transported to change immediately over to the transportation of another type of material.

In particular it is an object of the present invention to provide a conveyer which may be built, if desired, of such a size that it has a transporting distance on the order to 20–30 meters, while also having a transporting capacity on the order of 20–30 tons per hour. This of course is in sharp contrast with conventional conveyers under equivalent conditions where the capacity is on the order of 10 tons per hour.

In order to achieve the above objects, the conveyer of the invention is primarily characterized in that the supporting bearings for the conveyer screw with their mounting walls close the channel so that at the location of these bearings and mounting walls it is not possible for the conveyed material to continue to travel. In order to conduct the material past and beyond the bearings and walls carrying the same, suitable bypass means have been provided at the channel which accomodates the rotary screw means, the bypass means being situated adjacent each bearing and supporting wall therefor. Also, the cover which closes the channel can be placed on the channel in such a way that a sufficient continuous space is formed in the upper part of the channel to provide for the continuous travel of the conveyed material.

In accordance with the invention the conveyor for the granular material includes an elongated hollow channel means for receiving granular material which is to be conveyed along the interior of this channel means. A cover means covers the channel means. A rotary screw means extends longitudinally along the interior of the channel means for conveying granular material therein longitudinally along the interior of the channel means. This rotary screw means includes an elongated shaft extending longitudinally along the interior of the channel means and a screw carried by the shaft. At least one bearing means is situated in the channel means at a portion of the shaft which is situated between opposed ends thereof, so as to support the shaft for rotation. A transverse wall means is carried by the channel means in the interior thereof and supports this bearing means, so that the wall means and bearing means together block the flow of granular material longitudinally along the interior of the channel means. A bypass means is operatively connected with the channel means at the region of the transverse wall means and bearing means carried thereby for directing the material conveyed by the rotary screw means along a path at the region of the wall means and bearing means which bypasses this wall means and bearing means.

BRIEF DESCRIPTION OF DRAWINGS

The invention is illustrated by way of example in the accompanying drawings which form part of this application and in which:

FIG. 1 is a schematic longitudinal elevation of one embodiment of a conveyor according to the invention;

FIG. 2 illustrates the structure of FIG. 1 in a position where the material is discharged at an intermediate outlet;

FIG. 3 is a transverse section of the structure of FIG. 1 taken along line 3—3 of FIG. 1 in the direction of the arrow;

FIG. 4 is a transverse section of the structure of FIG. 1 taken along line 4—4 of FIG. 1 in the direction of the arrow;

FIG. 5 is a fragmentary longitudinal sectional elevation of features of the invention shown in FIGS. 1 and 2 but illustrated in greater detail in FIG. 5;

FIG. 6 is a transverse section of the structure of FIG.. 5 taken along line 6—6 of FIG. 5 in the direction of the arrow;

FIG. 7 is a transverse section of the structure of FIG. 5 taken along line 7—7 of FIG. 5 in the direction of the arrow;

FIG. 8 is a top plan view of part of the structure of FIGS. 1 and 2 where an intermediate outlet is located;

FIG. 9 is a schematic longitudinal elevation of a further embodiment of a conveyer of the invention;

FIG. 10 is a longitudinal elevation of the structure of FIG. 9 shown in a different position where material is discharged from an intermediate outlet;

FIG. 11 is a transverse section of the structure of FIG. 9 taken along line 11—11 of FIG. 9 in the direction of the arrow;

FIG. 12 is a transverse section of the structure of FIG. 10 taken along line 12—12 of FIG. 10 in the direction of the arrow;

FIG. 13 is a top plan view fragmentarily illustrating an embodiment similar to that of FIGS. 9-12 where it has an additional intermediate outlet;

FIG. 14 is a fragmentary elevation of the structure of FIG. 13;

FIG. 15 is a partly sectional plan view of the structure of FIG. 14 taken along line 15—15 of FIG. 14 in the direction of the arrow;

FIG. 16 is a transverse section of the structure of FIG. 13 taken along line 16—16 of FIG. 13 in the direction of the arrow; and FIG. 17 shows the structure of FIG. 16 in a different position.

DESCRIPTION OF PREFERRED EMBODIMENTS

Referring now to FIGS. 1 and 2, the schematically illustrated conveyor of the invention is adapted to transport granular material. The conveyor includes an elongated channel 10 of substantially U-shaped cross section, as is apparent from FIGS. 3 and 4. An elongated rotary screw 11 extends along the interior of the channel means 10. The rotary screw means 11 is driven by a suitable drive motor 12 or the like. A cover means 13 covers the channel 10, this cover means 13 itself being of a substantially rectangular cross section and resting at its bottom side edges on the top side edges of the channel means 10, the cover means 13 and channel means 10 being interconnected releasably in any suitable way as by a plurality of straps 30 respectively connected with the channel means 10 and cover means 13 as by any suitable screws or the like as indicated at the right part of FIG. 4. Thus, the cover means 13 together with the channel means 10 define an elongated space having a hollow interior in which granular material can be conveyed by the rotary screw means 11.

As is shown schematically in FIGS. 1 and 2, the cover means 13 is provideed at its left end with a supply aperture 14 which may be of a funnel-shaped configuration and through which the granular material is introduced into the interior of the conveyer. Thus the cover means 13 may be suitably shaped so that it will have the funnel-like configuration suitable for supplying the granular material to the conveyer. In order to discharge the conveyed material, the conveyer has distant from the inlet 14 an end outlet means 15 in the form of a suitable pipe extending downwardly from the end of the channel 10 and the cover means 13 as shown schematically at the right of FIGS. 1 and 2. However, where the conveyer is relatively long, it will have one or more intermediate outlet means, and one such intermediate outlet means 19 is shown schematically in FIGS. 1 and 2 while also being indicated in FIGS. 3 and 4. As may be seen from the top plan view of FIG. 8, the cover means 13 has a laterally extending portion forming the top of the intermediate outlet means 19, the latter extending downwardly from the cover means 13 in the manner shown most clearly in FIGS. 3 and 4. This arrangement of the intermediate outlet means 19 is somewhat different from previously known structures and therefore is described in detail below.

In accordance with one of the important features of the present invention, the rotary screw means 11 has an elongated shaft 32 carrying the screw 34, and this shaft 32 is supported for rotary movement intermediate its opposed ends by at least one bearing means 16, a plurality of bearing means 16 being illustrated in the example of FIGS. 1 and 2. The several bearing means 16 are respectively carried by a plurality of transverse wall means 36, this construction being shown schematically in FIGS. 1 and 2 and in detail in FIG. 5. The wall means 36 together with the bearing means 16 is also apparent from FIG. 6. Thus the wall means 36 extends completely across the channel means 10, terminating in an upper edge 38. Thus the flow of material along the interior of the channel means 10 is blocked by the transverse wall means 36 and the bearing means 16 carried thereby. As a result of this construction it is possible to provide a strong firm mounting for the bearing, and in addition it is possible to use a larger bearing while the shaft 32 also can be made sturdier than has heretofore been possible.

In order to be able to continue the transport of the granular material past the several transverse wall means 36 and bearing means 16 carried thereby, a plurality of bypass means 18 are provided where the transverse wall means 36 and bearing means 16 are respectively located. Each bypass means 18 includes a portion of the cover means 13 which is shaped in the manner indicated in FIGS. 1 and 2 so as to extend upwardly to a higher elevation over the transverse wall means 36 and bearing means 16 carried thereby. Thus the cover means 13 has over each transverse wall means 16 an upper edge portion spaced upwardly beyond the upper edge 38 of the transverse wall means 36 to define therewith a space through which the granular material can travel as shown by the curved arrows in FIGS. 1 and 2. Thus in this way a space is provided through which the material can travel from the upstream side to the downstream side of each bearing means 16 and the transverse wall means 36 carrying the same.

Furthermore, in order to facilitate the bypassing of the material, each bypass means includes an inclined baffle 17 extending in the upstream direction downwardly from the upper edge 38 of each transverse wall means 36 in the manner shown most clearly in FIG. 5. Each baffle 17 is of course formed with an opening through which the shaft 32 extends. The baffle 17 is also illustrated in FIG. 7. Thus by way of the baffle 17 the granular material is conveyed upwardly along the upper inclined surface of the baffle 17 to flow through the space afforded by the bypass means 18 over the upper edge 38 of each transverse wall means 36, the material then dropping in the downstream direction back down to the rotary screw means 11 to continue to be conveyed thereby.

With the conveyor of the invention the material may, if desired, also be withdrawn from the channel means 10 prior to the end outlet means 15, and for this purpose the intermediate outlet means 19 is provided. According to a further feature of the invention, it is advantageous to situated such an intermediate outlet means 19 at the location of a bypass means 18. Thus the bypass means 18 affords a convenient location for connecting the additional outlet means 19 to the channel means by way of the cover means 13. In this way it is possible to have the advantage of being able to install the additional intermediate outlet means 19 even after the conveyer is constructed because the remainder of the conveyer remains substantially without any structural changes.

Furthermore, a flow-control means 20 is provided for controlling the flow of the granular material with respect to the intermediate outlet means 19. This flow-control means 20 may have the position shown in FIG. 1 where it prevents the material from entering the intermediate outlet means 19, or it may have the position shown in FIG. 2 where it will permit the granular material to discharge through the intermediate outlet means 19 while preventing the granular material from continuing to travel to the end outlet means 15.

As is apparent from FIG. 4 as well as FIGS. 1 and 2, the cover means 13 carries beneath its upper wall at the region of the upper inlet opening 40 of the intermediate outlet means 19 a transverse horizontal wall 42 situated over the rotary screw means 11. The front edge of the wall 42 is situated directly next to and extends along a transverse shaft 23 supported for turning movement through suitable openings formed in the side walls of the cover means 13 adjacent the lower edges thereof as is apparent from FIG. 3. The shaft 23 extends to the exterior of the cover means 13 where it has a handle or crank portion 44 accessible to the operator so that the operator can conveniently turn the flap 20 which forms the flow-control means between the closed position of FIG. 1 and the open position of FIG. 2. The shaft 23 can be frictionally maintained in the positions of FIGS. 1 and 2 or any suitable releasable lock structure may be provided for this purpose. Thus, in the position of FIGS. 1 and 3 the flap 20 which forms the flow-control means blocks entry of granular material into the space between the upper surface of the wall 42 and the portion of the cover means 13 situated thereover, so that the granular material cannot flow into the intermediate outlet means 19. However, the operator can turn the handle 44 so as to turn the shaft 23 and the flap 20 fixed thereto from the position of FIG. 1 into the position of FIG. 2 where the flap 20 engages the upper edge 38 of the transverse wall means 36. Thus the upper edge of the flap 20, as viewed in FIG. 1, turns down to engage the top edge of the transverse wall means 36 when the flow-control means 20 is displaced from the position of FIG. 1 into the position of FIG. 2. Now the material which is fed up the baffle 17 situated directly in front of and forming an extension of the flap 20 will be fed to the flap 20 and therealong onto the wall 42 and from the latter through the opening 40 to drop down through the additional or intermediate outlet means 19. Thus, when the flow-control means 20 is in the position shown in FIG. 1 the material will continue to be conveyed to the end outlet means 15 whereas when it is in the position of FIG. 2 the material will be discharged through the intermediate outlet means 19.

According to a further feature of the invention, at least one of the bypass means 18 is provided with a blower means 22 communicating through an inlet pipe 21 with the space defined between the upper portion of the cover means 13 and the upper edge of the transverse wall means 36 situated therebetween. This blower means 22 thus sucks air through the inlet 21 into the blower means 22 to be discharged from the blower means 22 to any desired location. In this way it is possible to remove impurities from the granular material. Such impurities may be in the form of fine foreign particles or the like which otherwise would be entrained with the granular material to be transported therewith. Thus, the left bypass means 18 of FIG. 1 is provided with a hole in its top wall connected to the inlet pipe 21 which leads to the cowling of the blower 22. For the blower means 22 it is possible to use any known blower, and the disposal of the air containing the impurities may be taken care of in any appropriate manner.

In the embodiment of the invention which is illustrated in FIGS. 9-12, the rotary screw means 11 also is supported by the bearings 16 which in turn are carried by transverse wall means as described above in connection with FIGS. 1-18. Also, the bypass means includes the inclined baffles 17 schematically indicated in FIGS. 9 and 10. However, in this embodiment the cover means 13 has an upper wall situated at a sufficient distance above the rotary screw means 11 to make it possible to provide for an effective bypass of each bearing means 16 and the transverse wall means carrying the same without necessitating the outwardly bulging portions indicated in FIGS. 1 and 2.

In this embodiment also there is an intermediate outlet means 19a through which the material may optionally be discharged in advance of the end outlet means 15. In this embodiment also the intermediate outlet means 19a is situated at the region of one of the bypass means. In this way it is easily possible to take advantage of the upward flow of the material over the transverse wall means to facilitate removal of the material at the intermediate outlet means 19a. In this case also it is possible to install such additional outlet means 19a even after the conveyor is constructed inasmuch as minimum structural changes are required. In the embodiment of FIGS. 9-12, there is a flow-control means 20a in the form of a turnable flap which in the position shown in FIG. 10 prevents the material from flowing all the way up to the end outlet means 15 and instead directs the material into the additional outlet means 19a as indicated by the arrow in FIG. 10. On the other hand, when the flap or flow-control means 20a is situated in the position shown in FIGS. 9 and 11, then the entrance to the intermediate outlet means 19a is closed and the material continues to travel to the end outlet means 15. The flow control or flap means 20a has the structural shape of an angular flap provided with a turnable shaft 23a to which this flap is connected, this shaft 23a extending parallel to the axis of the screw means 11. Thus, this flap 20a when in the position shown in FIGS. 9 and 11 prevents the granular material from flowing through the opening 24 into the intermediate outlet means 19a. In the position of FIGS. 10 and 12, however, the flap 20a blocks the flow of the material beyond the baffle 17 engaged by the flap 20a, and instead the material is permitted to flow through the opening 24 into the intermediate outlet means 19a.

The details of an embodiment for achieving results similar to those shown in FIGS. 9-12 are illustrated in FIGS. 13-17. Thus, in the embodiment the cover means 13 is interrupted so as to have an opening closed by a swingable door 50 of substantially L-shapeed cross section. The door 50 is connected by a hinge 52 to the top end of the outer wall 54 of the additional outlet means 19b. Distant from the hinge 52 the swingable door 50 carries a handle 56 by means of which the door 50 may be swung upwardly from and back down to the position shown most clearly in FIGS. 16 and 17. It will be seen from FIGS. 16 and 17 that the intermediate outlet means 19b is situated a slight distance from the channel means 10, and between the channel means 10 and the intermediate outlet means 19b there is a shaft 23b corresponding to the shaft 23a and supported for turning movement in front and rear walls forming part of the extension of the cover means 13. This shaft 23b has at its front end a transverse extension 58 forming handle by means of which the shaft 23b can be turned by the operator. Fixed to the shaft 23b is the flap 60 of the illustrated flow-control means. This flap 60 is shown in FIGS. 15 and 16 in its position situated over the rotary screw means 11 with the front edge of the flap 60 forming a continuation of the upper edge of the baffle 17. The upper surface of the flap 60, as viewed in FIGS. 15 and 16, carries an elongated baffle 62 which is inclined as shown in FIG. 15 so that the rear edge of this baffle is situated next to the rear end of the shaft 23b while the front end of the baffle is situated next to the side wall of the cover means which is distant from the shaft 23b.

Thus, with this embodiment when the operator engages the handle 58 to turn the flap 60 to the position shown in FIGS. 15 and 16, the material conveyed at the baffle 17 will flow along the upper surface of the flap 60 and along the inclined baffle 62 so as to be directed into the intermediate outlet means 19b, as shown most clearly in FIG. 15. The parts in this position are also illustrated in FIG. 16.

When it is desired to prevent the material from entering the intermediate outlet means 19b, the flap or flow-control means 60, 62 is turned from the position of FIG. 16 to that of FIG. 17. For this purpose the operator will engage the handle 56 and swing the door 50 up, so that it is now possible to turn the handle 58 and the shaft 23b so as to situate the flap 60 and the baffle 62 in the position indicated in FIG. 17. Thus in this position the opening into the intermediate outlet means 19b is closed and instead the material will continue to travel freely to the end outlet means 15. Once the flow-control means 60, 62 is situated in the position of FIG. 17 the operator will of course return the door 50 to the position illustrated in FIG. 17 and the door 50 will now maintain the parts in the illustrated position. When it is desired to return to the position of FIG. 16, the operator need only again swing the door 50 up so that the shaft 23b can be turned together with the flow control means back to the position of FIG. 16, and then the door 50 is returned to the position shown in FIG. 16 so that now the material will be directed to the intermediate outlet means 19b.

It is thus apparent that with the conveyor of the invention those structural drawbacks of the prior art referred to above have been eliminated. The relatively simple structure of the invention provides considerable advantages over previously known screw conveyers. The structure of the invention enables a firmer mounting of bearings to be used as well as larger bearings and a sturdier screw shaft. Moreover it is possible to rotate the rotary screw means at a higher speed so as to obtain a higher transporting capacity. Furthermore the conveyer of the invention may have a longer than normal length, and in spite of this the conveyer will be durable and reliable in operation. As a result of the high speed rotation of the conveyor of the invention, it also may be made smaller than a conventional conveyer while having the same output. As a result of the higher speed of rotation there will also be no residues of the transported material remaining at the bottom of the channel means after a given transporting operation, so that it is possible with the conveyer of the invention after one material has been transported to change immediately over to another material. The conveyer of the invention can very easily be built so that it has a transporting distance on the order of 20-30 meters and and a transporting capacity on the order of 20-30 tons per hour, in contrast with the capacity of conventional conveyer under equivalent conditions which is on the order of 10 tons per hour.

With the conveyer of the invention the separation of foreign particles is carried out in a highly efficient manner because of the presence of the bypass means at the location of the bearing which supports the rotary screw means. The structure of the bypass means of the invention throws the granular material (grain) for example) into the air space over the transverse wall means and bearing means which are bypassed, so that in this way impurities present in the grain after threshing, such as bits of straw, dust and loose husks, become separated and are sucked into the blower means to be blown out by the latter. This construction of a purifier used with the conveyer of the invention is simple and at the same time the throughput and purifying capacity of the purifier is substantially higher than that of presently known favorably priced purifiers to be found on the market.

While in the above certain favorable embodiments of the invention have been illustrated, it will be obvious to those skilled in the art that numerous modifications are possible without departing from the scope of the protection afforded by the claims which follow. The conveyer of the invention is equally well suited for use in a horizontal attitude and as an ascending conveyer. It is furthermore to be noted that with the construction of the invention it is possible to utilize channels of different cross sections. For example it is possible also to utilize a conveyer screw situated within the tube of circular cross section, and of course also in connection with other types of conveyer screws.

What is claimed is:

1. In a conveyer for granular material, elongated hollow channel means for receiving granular material which is to be conveyed along the interior of said channel means, cover means covering said channel means, rotary screw means extending longitudinally along the interior of said channel means for conveying granular materials therein longitudinally along the interior of said channel means, said rotary screw means including an elongated shaft extending longitudinally along the interior of said channel means and a screw carried by said shaft, at least one bearing means situated in said channel means at a portion of said shaft situated between opposed ends of said shaft for supporting said shaft for rotation, transverse wall means carried by said channel means in the interior thereof and supporting said bearing means, so that said wall means and bearing means together block the flow of granular material longitudinally along the interior of said channel means, and bypass means operatively connected with said channel means at the region of said transverse wall means and bearing means carried thereby for directing the material conveyed by said rotary screw means along a path at the region of said wall means and bearing means which bypasses said wall means and bearing means.

2. The combination of claim 1 and wherein said cover means includes an upper wall portion extending over and spaced from said screw means, said transverse wall means terminating in an upper edge situated beneath said upper wall portion of said cover means to define with the latter a space through which granular material can flow while bypassing said transverse wall means and bearing means carried thereby, and said bypass means including an inclined baffle extending downwardly from said upper edge of said transverse wall means in an upstream direction considered in the direction of material flow from said transverse wall means so that said rotary screw means directs the granular material upwardly along said inclined baffle and through the space between said upper edge of said transverse wall means and said upper wall portion of said cover means to continue to travel beyond said space downwardly to said screw means at a location downstream of said transverse wall means and bearing means to be further conveyed by said screw means beyond said transverse wall means and bearing means carried thereby.

3. The combination of claim 1 and wherein an inlet means communicates with said channel means upstream of said transverse wall means for introducing material into said channel means to be conveyed by said rotary screw means, an end outlet means communicating with said channel means downstream of said transverse wall means for providing for discharge of material out of said channel means through said end outlet means, intermediate outlet means situated at the region of said bypass means for discharging granular material from said channel means before the material reaches said end outlet means, and flow-control means cooperating with said intermediate outlet means and having one position closing said intermediate outlet means while freeing the granular material to flow past said intermediate outlet means to said end outlet means and another position opening said intermediate outlet means and directing the material from said channel means out through said intermediate outlet means before the granular material can continue to flow toward said end outlet means.

4. The combination of claim 3 and wherein said cover means has an upper wall portion extending across said channel means and situated over and upwardly beyond said rotary screw means, said transverse wall means terminating in an upper edge defining with said upper wall portion of said cover means a space through which the granular material can flow while bypassing said transverse wall means and bearing means carried thereby, and said bypass means including an inclined baffle extending from said upper edge of said transverse wall means at the upstream side thereof downwardly along the interior of said channel means for directing material conveyed by said screw means toward said transverse wall means upwardly along said inclined baffle means to flow through said space between said upper edge of said transverse wall means and said upper wall portion of said cover means, said flow-control means when in said one position thereof being situated away from said space between said upper wall portion of said cover means and said upper edge of said transverse wall means while closing said intermediate outlet means, and said flow-control means when in said other position thereof being situated adjacent said space at the downstream side thereof for receiving material flowing through said space and directing the material into said intermediate outlet means.

5. The combination of claim 4 and wherein said flow-control means is turnable with respect to said channel means between said positions of said flow-control means.

6. The combination of claim 5 and wherein said flow-control means is turnable about an axis extending transversely across said channel means.

7. The combination of claim 5 and wherein said flow-control means is turnable about an axis extending longitudinally of said channel means.

8. The combination of claim 5 and wherein said flow-control means when in said other position thereof has an edge extending along and engaging said upper edge of said transverse wall means for situating said flow-control means when in said other position thereof at a location for receiving the material travelling through said space and directing the material into said intermediate outlet means.

9. The combination of claim 2 and wherein a blower means is carried by said upper wall portion of said cover means and communicates with said space between said upper wall portion of said cover means and said upper edge of said transverse wall means for withdrawing fine foreign particles and the like from the granular material while the latter travels through said space bypassing said transverse wall means to prevent the fine particles and the like from continuing to travel with the granular material downstream of said transverse wall means.

* * * * *